Sept. 23, 1969     H. ROSEN     3,468,602
CONTACT LENS WITH FLEXIBLE CENTRAL PORTION
Filed July 11, 1966     2 Sheets-Sheet 1
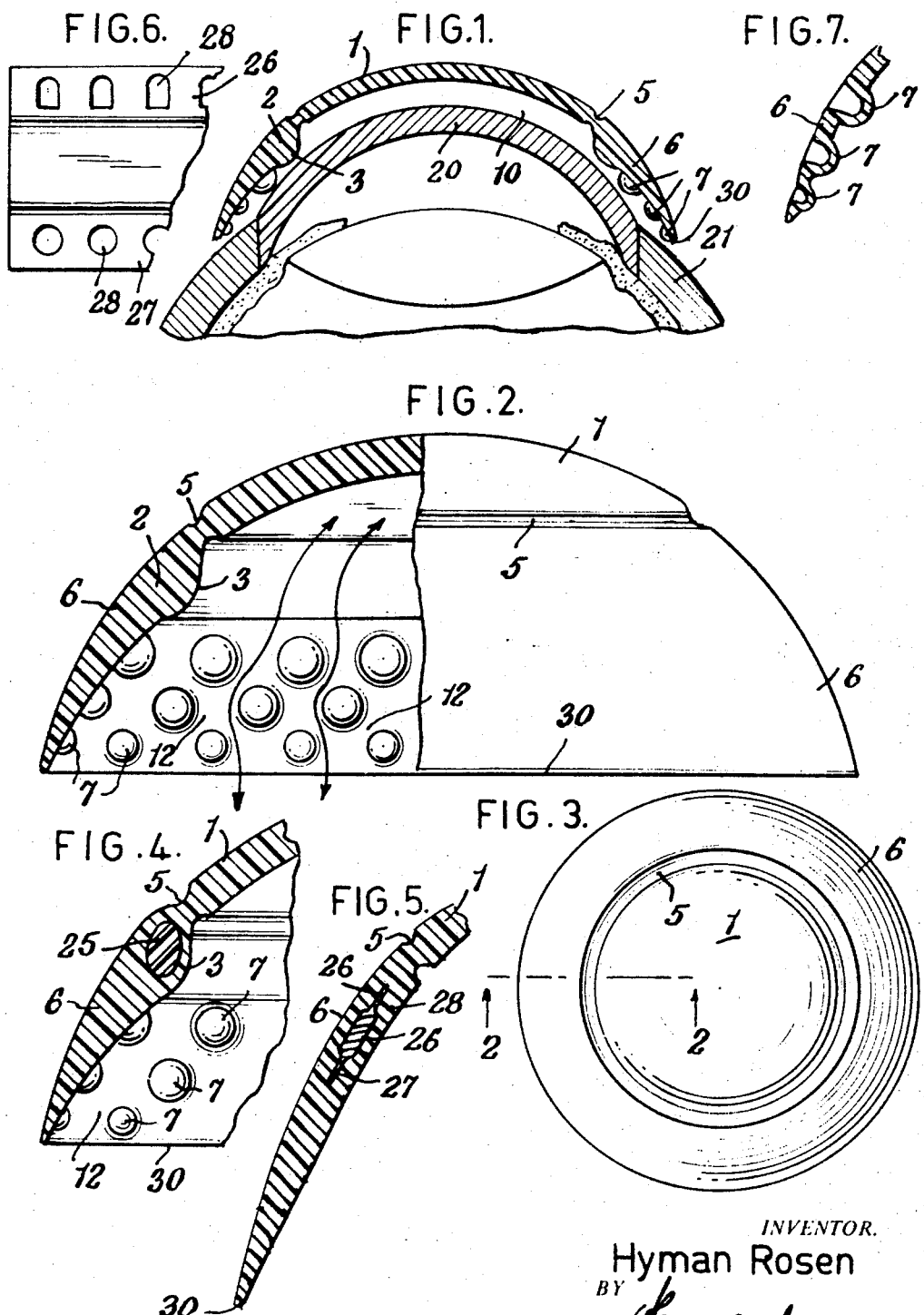
INVENTOR.
Hyman Rosen Sept. 23, 1969          H. ROSEN          3,468,602
CONTACT LENS WITH FLEXIBLE CENTRAL PORTION Filed July 11, 1966          2 Sheets-Sheet 2

INVENTOR.
Hyman Rosen
BY
*attorney*

United States Patent Office 3,468,602
Patented Sept. 23, 1969

3,468,602
CONTACT LENS WITH FLEXIBLE CENTRAL
PORTION
Hyman Rosen, 211 Everett Ave.,
Hewlett, N.Y. 11557
Filed July 11, 1966, Ser. No. 564,268
Int. Cl. G02c 7/04
U.S. Cl. 351—160       3 Claims

ABSTRACT OF THE DISCLOSURE

The invention relates to the structure of a yieldable and resilient corneal contact lens having a central and domed area capable of relative and substantial diaphragmatic action without contacting the eye and responsive to exertion and release of pressure induced by eyelid movement. Said lens has an outer peripheral area engageable with the eye and is provided with channels on the inner side to permit ingress and egress of eye or tear fluids to and from said domed area which latter serves as a fluid chamber. An intermediate thickened or reinforced peripheral area connected to the edge of the domed area serves as the support or fulcrum for the diphragmatic action of the domed area and also serves to connect with outer peripheral engageable area adapted to float on and adhere to the eye proximate to the cornea.

---

This invention relates generally to contact lenses adapted to be easily fitted to the individual wearer, to be worn with comfort, to correct vision and to aid materially in providing for better sight for certain corneal conditions.

It is an object of the invention to provide a contact lens of specified structure and which can be made in whole or in part of a soft and flexible plastic material thereby securing comfort in wear and by means of which resilient flexure as an effective diaphragm is imparted to at least a portion of the lens and particularly to its optical central portion. The lens thereby in effect becomes a responsive diaphragm for the optics and kinetics of the eye and serves to effect hydraulic pumping action of the tear layer within and outside of the lens. The structure furthermore is of such nature that the diaphragm portion at no time touches the corneal surface of the eye as will appear.

It is a further object of the invention to provide a lens which can be produced by known molding methods and inexpensively so that the lens can, after a relatively short period of wear, be disposed of and a new one substituted.

More particularly, the invention contemplates the provision of a contact lens having a central optical portion which is soft, flexible and resilient; which is capable of flexing under eyelid pressure and responding to physiological changes involving edema or serving as a shield under conditions of infections and adhesions without sensation and incidental irritation. The central optical portion has an effective mounting ring so that while it is capable of flexing, it will not distort from its desired shape. The lens is provided beyond said ring with a radially-extending eye-contacting soft flange or rim, the rim being internally formed with projections. The projections are adapted to be spaced apart so that they define flow spaces or passages between them, and the central diaphragmous portion of the lens, when the lens is worn, is maintained in spaced relationship from the cornea and there is maintained at all times a fluid chamber between said portion and the surface of the cornea with tear fluid therein. When the central portion of the lens is flexed or depressed under eyelid pressure upon blinking of the eyelid, the central part of the lens will be depressed but not to an extent to contact the cornea and the fluid, collected in the chamber, will only be partially expelled through the flow spaces or passages. Upon the restoration of the central portion of the lens to its normal position when eyelid pressure is relieved on the lens, a return flow of the fluid to the chamber will result.

With these and other objects to be hereinafter set forth in view, I have devised the arrangement of parts to be described and more particularly pointed out in the claims appended hereto.

In the accompanying drawing, wherein an illustrative embodiment of the invention is disclosed, FIG. 1 is a diagrammatic view of a portion of an eye with a lens of the improved construction applied thereto;

FIG. 2 is an enlarged side view of the lens, with a part thereof being shown in section, the section being taken on the line 2—2 of FIG. 3, looking in the direction of the arrows;

FIG. 3 is a top plan view of the lens;

FIG. 4 is a sectional view of a part of the lens showing the employment of an embedded stiffening ring;

FIG. 5 is a sectional view of a part of the lens, showing a different form of stiffening ring;

FIG. 6 is a view of the stiffening ring embodied in the structure of FIG. 5;

FIG. 7 is a detail view showing how the projections can be produced in the inner surface of the flange or rim of the lens;

Figure 8:
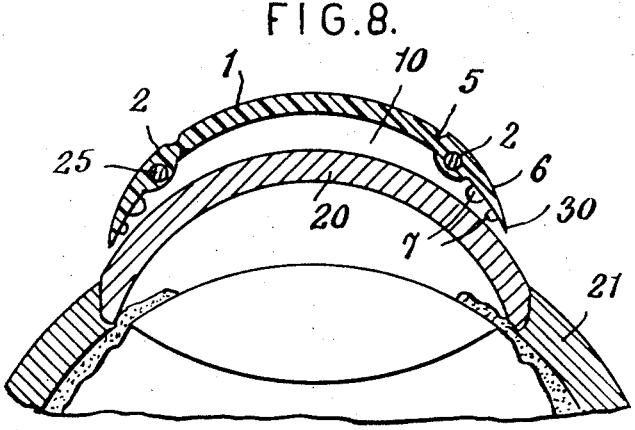
FIG. 8 is a view similar to FIG. 1 with the lens thereof shown being of a size to fit the cornea only.

In FIG. 1 of the drawing is diagrammatically shown a portion of an eye, the cornea thereof being shown at 20 and the sclera at 21. In the embodiments of the invention shown in the drawings, the lens is preferably composed of a soft transparent thermoplastic material such as polyvinyl chloride or other inert thermoplastic composition capable of receiving a superimposing layer of material for any required purposes of lamination. The lens includes a central flexible, kinetic and optical portion or diaphragm indicated at 1, this part of the lens being of such flexibility that it is capable of flexure by eyelid pressure during lowering of the eyelid to thereby expel some of the eye fluid that is confined between this part of the lens and the corneal part 20 of the eye located behind it as shown in FIG. 1.

Figure 9:
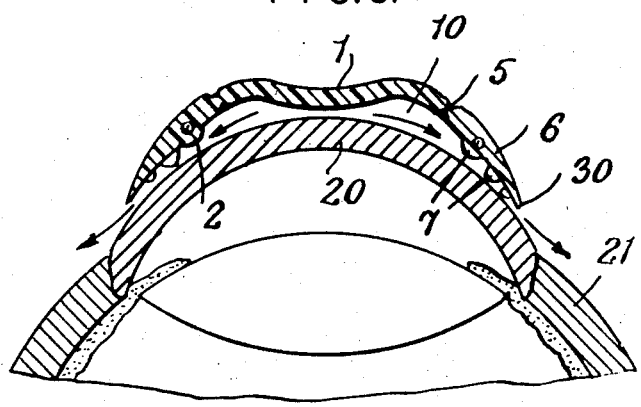
FIG. 9 is a similar view showing the fluid flow when the central part of the lens is depressed by eyelid pressure.

In the embodiment of FIG. 1 the lens is shown of a size to fit over the cornea and to extend over a part of the sclera. In FIGS. 8 and 9 the lens is of smaller size to fit the cornea only.

The peripheral edge portion of the part 1 of the lens is encircled by a mounting or stiffening ring 2 which can be provided in a number of ways. One way is to materially thicken the body of the lens around the edge of the part 1 as shown at 3 in FIGS. 1 and 2. Another way of providing support for the central part 1 of the lens is to incorporate or embed a separate ring of relatively stiff material, and of greater stiffness than the part 1, in the body of the lens as shown at 25 in FIG. 4. Such a ring can be composed of a relatively stiff plastic and can be of the shape shown in FIG. 4 or of any other desired shape. For example, in FIG. 5 the mounting or reinforcement or stiffening ring may assume the shape shown in FIGS. 5 and 6, wherein the embedded ring has flanges 26 and 27 provided with the apertures shown at 28. The edge of the central part of the lens may be reinforced in any other desired way. The mounting or stiffening ring as employed herein serves to maintain the shape of the central lens portion 1 as heretofore stated since it holds this part of the lens to a specific shape and yet enables it to flex under lid pressure to thereby cause the expulsion and retraction of eye fluid during the blinking movements of the eyelid, the central portion 1 serving as a kinetic diaphragm as well as an optical element.

The thickened portion of the lens, shown at 3, employed to form a stiffened annular ring around the central portion 1 of the lens, may thus be an integral part of the portion 1 of the lens; it can be a hardened inserted or embedded ring or it can be otherwise produced. The optimum sought is a stiffened annulus arranged around the central lens portion 1 to maintain the stability thereof during the use of the lens.

To facilitate the flexure of the central or diaphragmous part 1 of the lens under eyelid pressure, the portion 1 of the lens can be provided with a weakened line or groove 5 located around its edge to augment the function of the mounting ring.

The lens is provided with a radially-extending rim or flange 6 located beyond the mounting ring or stiffened part of the lens, said rim constituting an eye-contacting element, and it is provided on its inner surface with a plurality of inwardly projecting protuberances 7. In the form shown these protuberances are disclosed as rounded nodes which increase in height from the outer peripheral edge 30 of the rim toward the inner edge thereof as clearly shown in FIGS. 1 and 2. This arrangement is such that when the contact lens is worn, the protuberances, or at least some of them, will rest against the surface of the eye.

The shape of the lens is such that when it is placed over the eye as shown in FIG. 1, the central flexible diaphragm 1 of the lens will be spaced away from the cornea 20 of the eye so that a fluid chamber 10 will be formed between the surface of the cornea and the inside surface of the part 1 of the lens. The protuberances 7 or other irregularities provided on the inside face of the rim or flange 6 are spaced apart so that fluid passages 12 are resultantly formed between the protuberances. The protuberances as said may be solid nodes molded on the flange or rim 6 or they may, as shown in FIG. 7, be produced by dimpling of the rim or flange. The protuberances may be of any other desired shape as distinguished from the round nodes disclosed in the drawing.

The spaces or passages 12 between the protuberances 7 lead from the chamber 10 to outside of the lens so that the eye fluid can flow in opposite directions through the passages from the chamber 10 as indicated by the arrows in FIG. 2.

When the lens is fitted on the eye, the diaphragm part 1, because spaced from the cornea 20 of the eye, will permit the collection of eye fluid behind the chamber 10. This aids in the correction of corneal surface astigmatism and irregularity and provides for comfort in the wear of the lens.

When the eyelid closes and opens, the "breathing function" of the diaphragm portion 1 of the lens will cause same to be slightly flexed or depressed inwardly as shown in FIG. 9 and this portion of the lens, thus acting as a flexible and resilient diaphragm, will first expel some of the eye fluid out of chamber 10 from behind the portion of the lens and then, upon the return flexure of the part 1 to its normal form, the fluid will be drawn back into the chamber 10. The out-flow of the fluid is indicated by the arrows in FIG. 9. The central portion 1 of the lens thus provides a hydraulic pump element and by the movement of the fluid from within the chamber 10 through the passages 12 the fluid will provide a washing action on the surface of the eye. While the central part 1 of the lens is depressed as shown in FIG. 9, under eyelid pressure, it is so spaced from the surface of the cornea that when depressed it does not touch the surface of the eye.

The stiffened peripheral edge area of the central part of the lens, will permit flexure of this part of the lens as herein described while maintaining a sphericity of the lens, thus not disturbing the required optical conditions.

The rim or flange portion 6 of the lens may be of a flexibility similar to that of the central part 1 of the lens or it may be either of greater or less stiffness. The construction of the lens is such that all portions of the same may be integrally molded of a suitable transparent material, or if desired the parts 1, 3 and 6 may be separately produced and suitable united.

The arrangement described is such that a lens of this kind can be economically produced and hence can be sold cheaply and as a result it can be discarded after a relatively short period of use. The structure of the lens is such that fitting procedure is greatly simplified so that the lens can be fitted quickly and by persons with relatively little optical experience.

The disposition of and the continued maintenance of eye or tear fluid behind the lens and over the cornea of the eye without corneal contact by the diaphragm part is highly advantageous and provides in many cases for the correction of corneal irregularities and resultant corneal astigmatism. Conditions of edema produced by colds, menstrual periods and fluid imbalance; and use of the lens as a shield during conditions of infection or adhesions between lid and cornea are accommodated by the invented structure. Such accommodation is due to the responsiveness of the diaphragm to physiological changes without sensation and incidental irritation.

I wish it understood that minor changes and variations in the structure, material, location, integration and number of parts may all be resorted to without departing from the spirit of the invention.

What I claim is:

1. A soft plastic corneal contact lens adapted to float on and adhere to the cornea comprising a transparent, non-contacting, resiliently distorable and normally dome-shaped central lens portion adapted to form with the cornea the upper wall of a tear fluid chamber, an outer peripheral portion having spaced projections formed on the inner surface engageable with the peripheral portion of the cornea and also providing fluid passages therebetween for egress and ingress of tear fluid from and into the fluid chamber, and an intermediate thickened portion joining the central and peripheral portions, the juncture of the central and peripheral portions being grooved to provide an annular area of reduced thickness, said central lens portion being adapted to serve as a diaphragm wherein on eyelid closure the diaphragm yields inwardly without engaging the corner forcing tear fluid out of the chamber, and wherein on eyelid opening the diaphragm springs back to normally domed position and thereby drawing tear fluid into the said chamber.

2. A soft corneal contact lens as set forth in claim 1 wherein said intermediate thickened portion includes a stiffening core embedded in the material of the corneal contact lens.

3. A soft corneal contact lens as set forth in claim 1 wherein said spaced projections increase in size from the outer to the inner periphery of said peripheral portion.

References Cited

UNITED STATES PATENTS

| | | | |
|---|---|---|---|
| 2,211,086 | 8/1940 | Tillyer | 350—160 |
| 2,241,415 | 5/1941 | Moulton | 351—162 |
| 2,664,025 | 12/1953 | Herman | 351—160 X |
| 3,228,741 | 1/1966 | Becker | 351—160 |

DAVID H. RUBIN, Primary Examiner

U.S. Cl. X.R.

351—161